United States Patent
Thangavel et al.

(10) Patent No.: US 11,578,655 B2
(45) Date of Patent: Feb. 14, 2023

(54) ENGINE INTAKE PRESSURE AND TEMPERATURE SENSOR PERFORMANCE ENHANCEMENT

(71) Applicant: Rosemount Aerospace Inc., Burnsville, MN (US)

(72) Inventors: Sathish Thangavel, Bangalore (IN); Andy Holl, Lakeville, MN (US); Aaron A. Cusher, Eagan, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 80 days.

(21) Appl. No.: 16/695,945

(22) Filed: Nov. 26, 2019

(65) Prior Publication Data

US 2020/0392896 A1    Dec. 17, 2020

(30) Foreign Application Priority Data

Jun. 17, 2019   (IN) ............... 201911024033

(51) Int. Cl.
   *F01B 25/26*   (2006.01)
   *F02C 7/04*    (2006.01)
   *G01L 19/00*   (2006.01)

(52) U.S. Cl.
   CPC ............ *F02C 7/04* (2013.01); *G01L 19/0092* (2013.01)

(58) Field of Classification Search
   CPC ............................... F02C 7/04; G01L 19/0092
   USPC ....................................................... 415/118
   See application file for complete search history.

(56) References Cited

U.S. PATENT DOCUMENTS

| | | | | | |
|---|---|---|---|---|---|
| 3,348,414 | A | * | 10/1967 | Waters | G01K 13/02 374/115 |
| 3,451,268 | A | * | 6/1969 | Meador | G01K 1/12 374/144 |
| 4,605,315 | A | * | 8/1986 | Kokoszka | G01K 13/02 374/138 |
| 4,765,751 | A | * | 8/1988 | Pannone | F01D 17/02 374/135 |
| 7,845,222 | B1 | * | 12/2010 | Goedel | G01D 5/30 73/170.02 |
| 9,488,534 | B2 | | 11/2016 | Wigen et al. | |
| 9,631,985 | B2 | * | 4/2017 | Herman | G01K 13/028 |
| 2004/0177683 | A1 | * | 9/2004 | Ice | G01K 13/028 73/170.02 |

(Continued)

OTHER PUBLICATIONS

European Search Report for European Application No. 19212065.7; dated Jul. 2, 2020; 8 pages.

*Primary Examiner* — Hung Q Nguyen
*Assistant Examiner* — Anthony Donald Taylor, Jr.
(74) *Attorney, Agent, or Firm* — Cantor Colburn LLP

(57) ABSTRACT

A pressure and temperature probe of a gas turbine engine includes a base portion and an airfoil portion extending from the base portion to an end portion located at a distal end of the probe. The airfoil portion includes a leading edge located at an upstream end of the probe relative to a direction of airflow across the probe. A temperature sensor is located in a temperature sensor chamber located in the airfoil portion, and a temperature airflow hole in the end portion is configured to admit an airflow into the temperature sensor chamber around the temperature sensor. The temperature airflow hole is configured and positioned such that the airflow admitted via the temperature airflow hole has a turning angle of less than 90 degrees into the temperature sensor chamber.

16 Claims, 4 Drawing Sheets

(56) References Cited

U.S. PATENT DOCUMENTS

| | | | |
|---|---|---|---|
| 2006/0056489 A1* | 3/2006 | Bernard | G01K 13/02 |
| | | | 374/208 |
| 2007/0220984 A1* | 9/2007 | Slagle | G01P 5/16 |
| | | | 73/708 |
| 2013/0163636 A1* | 6/2013 | Parsons | G01K 13/028 |
| | | | 374/158 |
| 2013/0315283 A1* | 11/2013 | Parsons | G01K 1/16 |
| | | | 374/208 |
| 2014/0064330 A1* | 3/2014 | Agami | G01K 13/028 |
| | | | 374/138 |
| 2014/0254631 A1 | 9/2014 | Slavens et al. | |
| 2015/0063414 A1* | 3/2015 | Wigen | G01K 13/028 |
| | | | 374/138 |
| 2015/0093244 A1* | 4/2015 | Wigen | G01K 13/028 |
| | | | 416/61 |
| 2018/0372556 A1* | 12/2018 | Parsons | G01K 13/028 |
| 2018/0372557 A1* | 12/2018 | Shaughnessy | G01K 13/028 |
| 2018/0372559 A1* | 12/2018 | Parsons | G01K 1/08 |
| 2019/0120079 A1* | 4/2019 | Rice | F01D 21/003 |

\* cited by examiner

ENGINE INTAKE PRESSURE AND TEMPERATURE SENSOR PERFORMANCE ENHANCEMENT

FOREIGN PRIORITY

This application claims priority to India Patent Application No. 201911024033, filed Jun. 17, 2019, and all the benefits accruing therefrom under 35 U.S.C. § 119, the contents of which in its entirety are herein incorporated by reference.

BACKGROUND

Exemplary embodiments pertain to the art of pressure and/or temperature probes for gas turbine engines.

Gas turbine engines use a combination pressure and temperature probe to measure pressure and temperature at an inlet of the gas turbine engine. Such a probe is commonly referred to as a P2T2 probe.

The probe typically includes a housing that protrudes into an inlet air stream of the gas turbine engine. The housing may have an aerodynamically efficient shape to reduce airflow disturbances in the inlet. A temperature sensing element is located in the housing, with an airflow inlet in the housing to supply airflow to the temperature sensing element. The airflow around the temperature sensing element plays a major role in the response time of temperature sensing. Generally, with increased airflow, the response time is decreased.

BRIEF DESCRIPTION

In one embodiment, a pressure and temperature probe of a gas turbine engine includes a base portion and an airfoil portion extending from the base portion to an end portion located at a distal end of the probe. The airfoil portion includes a leading edge located at an upstream end of the probe relative to a direction of airflow across the probe. A temperature sensor is located in a temperature sensor chamber located in the airfoil portion, and a temperature airflow hole in the end portion is configured to admit an airflow into the temperature sensor chamber around the temperature sensor. The temperature airflow hole is configured and positioned such that the airflow admitted via the temperature airflow hole has a turning angle of less than 90 degrees into the temperature sensor chamber.

Additionally or alternatively, in this or other embodiments the temperature sensor extends along a sensor central axis in the temperature sensor chamber, and the temperature airflow hole has an airflow hole central axis offset from the sensor central axis in a streamwise direction.

Additionally or alternatively, in this or other embodiments the airflow hole central axis is located upstream of the sensor central axis.

Additionally or alternatively, in this or other embodiments the airflow hole central axis is offset from the sensor central axis by between 0.5 and 1.0 times a diameter of the temperature airflow hole.

Additionally or alternatively, in this or other embodiments the end portion includes a first end portion surface, and a second end portion surface sloped toward the base portion relative to the first end portion surface with increasing distance from the leading edge. The temperature airflow hole is located at the second end portion surface.

Additionally or alternatively, in this or other embodiments the slope is one of a constant angle, a varying angle or a curvilinear slope.

Additionally or alternatively, in this or other embodiments a slope angle of the second end portion surface relative to the first end portion surface is between 2 and 6 degrees.

Additionally or alternatively, in this or other embodiments the temperature sensor extends along a sensor central axis in the temperature sensor chamber, and the temperature airflow hole has an airflow hole central axis offset from the sensor central axis in a streamwise direction.

Additionally or alternatively, in this or other embodiments a sensor slot is located along the airfoil portion as a secondary source of airflow to the temperature sensor chamber.

In another embodiment, an inlet of a gas turbine engine includes a casing having an casing inner wall thereby defining an inlet flowpath, and one or more pressure and temperature probes extending inwardly from the casing inner wall toward an engine central longitudinal axis. Each pressure and temperature probe includes a base portion, and an airfoil portion extending from the base portion to an end portion located at a distal end of the probe. The airfoil portion includes a leading edge located at an upstream end of the probe relative to a direction of airflow across the probe. A temperature sensor is located in a temperature sensor chamber located in the airfoil portion, and a temperature airflow hole is located in the end portion configured to admit an airflow into the temperature sensor chamber around the temperature sensor. The temperature airflow hole is configured and positioned such that the airflow admitted via the temperature airflow hole has a turning angle of less than 90 degrees into the temperature sensor chamber.

Additionally or alternatively, in this or other embodiments the temperature sensor extends along a sensor central axis in the temperature sensor chamber, and the temperature airflow hole has an airflow hole central axis offset from the sensor central axis in a streamwise direction such that the airflow hole central axis is located upstream of the sensor central axis.

Additionally or alternatively, in this or other embodiments the airflow hole central axis is offset from the sensor central axis by between 0.5 and 1.0 times a diameter of the temperature airflow hole.

Additionally or alternatively, in this or other embodiments the end portion includes a first end portion surface, and a second end portion surface sloped toward the base portion relative to the first end portion surface with increasing distance from the leading edge. The temperature airflow hole is located at the second end portion surface.

Additionally or alternatively, in this or other embodiments the slope is one of a constant angle, a varying angle or a curvilinear slope.

Additionally or alternatively, in this or other embodiments a slope angle of the second end portion surface relative to the first end portion surface is between 2 and 6 degrees.

In yet another embodiment, a gas turbine engine includes a fan driven by a turbine of the gas turbine engine, and an inlet located upstream of the fan, including a casing having an casing inner wall thereby defining an inlet flowpath, and one or more pressure and temperature probes extending inwardly from the casing inner wall toward an engine central longitudinal axis. Each pressure and temperature probe includes a base portion, an airfoil portion extending from the base portion to an end portion located at a distal end of the probe. The airfoil portion includes a leading edge located at an upstream end of the probe relative to a direction of airflow across the probe. A temperature sensor is located in a temperature sensor chamber located in the airfoil portion, and a temperature airflow hole in the end portion is configured to admit an airflow into the temperature sensor chamber around the temperature sensor. The temperature airflow hole is configured and positioned such that the airflow admitted via the temperature airflow hole has a turning angle of less than 90 degrees into the temperature sensor chamber.

Additionally or alternatively, in this or other embodiments the temperature sensor extends along a sensor central axis in the temperature sensor chamber, and the temperature airflow hole has an airflow hole central axis offset from the sensor central axis in a streamwise direction such that the airflow hole central axis is positioned upstream of the sensor central axis.

Additionally or alternatively, in this or other embodiments the airflow hole central axis is offset from the sensor central axis by between 0.5 and 1.0 times a diameter of the temperature airflow hole.

Additionally or alternatively, in this or other embodiments the end portion includes a first end portion surface, and a second end portion surface sloped toward the base portion relative to the first end portion surface with increasing distance from the leading edge. The temperature airflow hole is located at the second end portion surface.

Additionally or alternatively, in this or other embodiments a slope angle of the second end portion surface relative to the first end portion surface is between 2 and 6 degrees.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
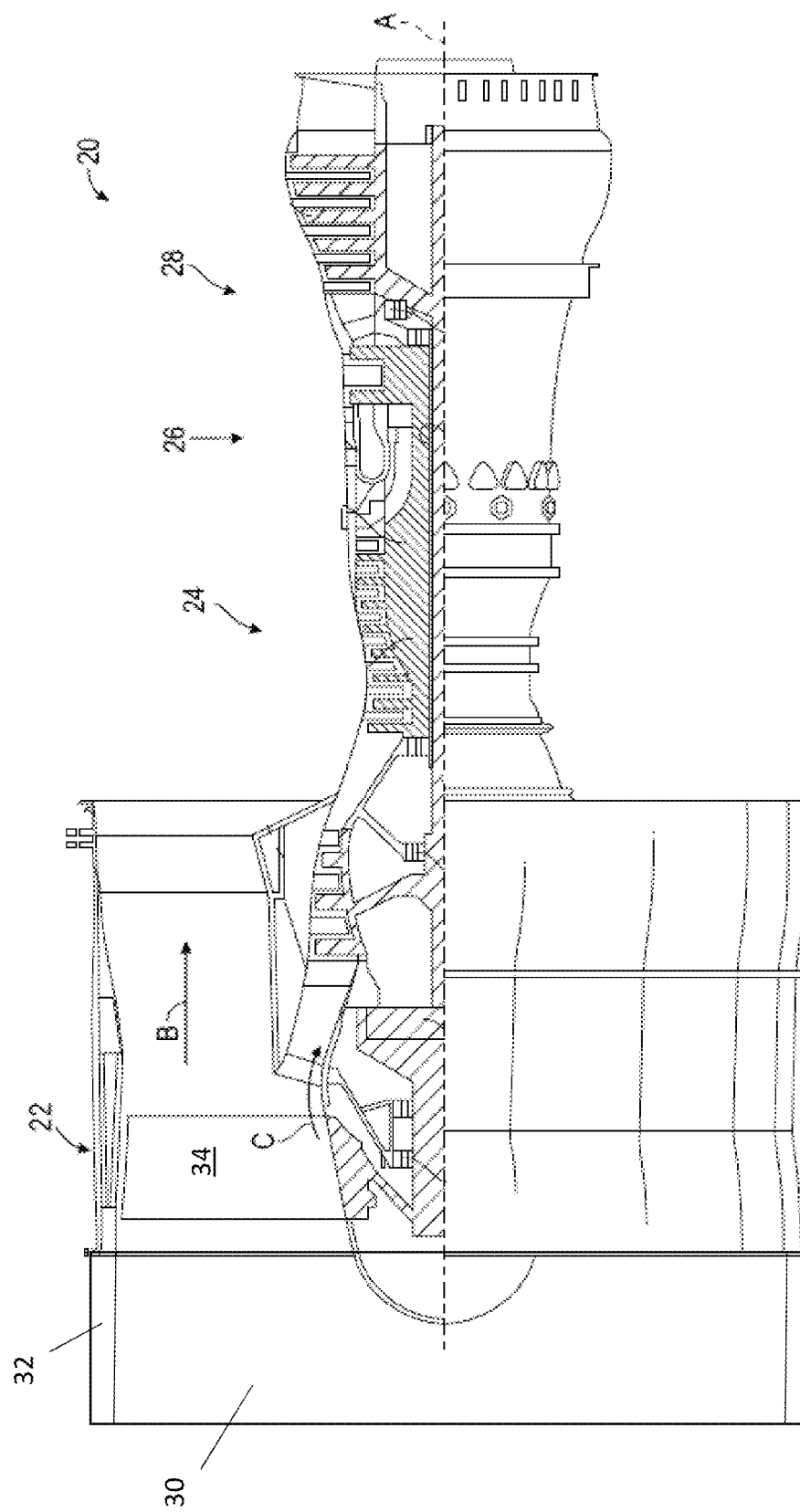
FIG. 1 is a partial cross-sectional illustration of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The fan section 22 includes an inlet portion 30, defined by a casing 32 extending upstream of a fan 34 of the fan section 22.

Figure 2:
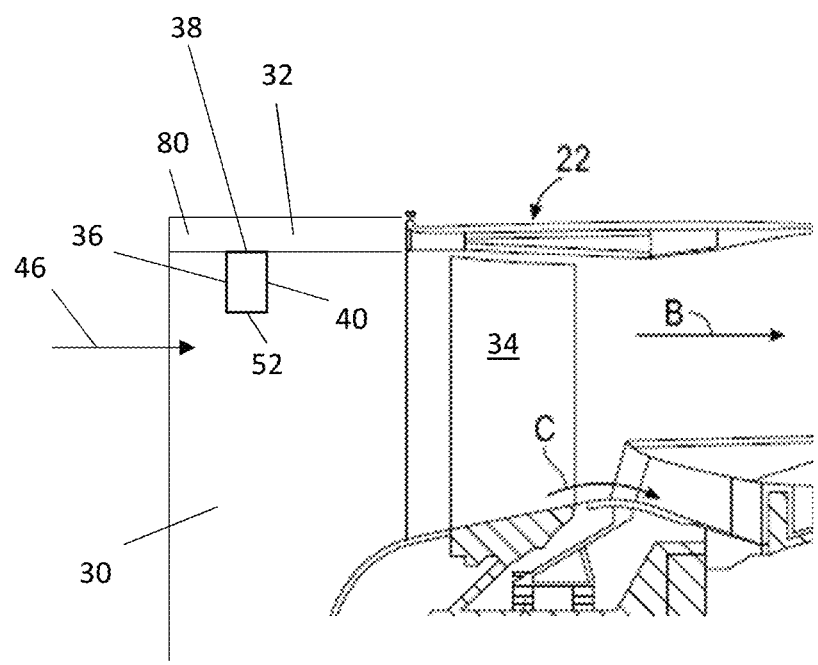
FIG. 2 is a partial cross-sectional view of an inlet of a gas turbine engine including a pressure and temperature probe.
Figure 3:
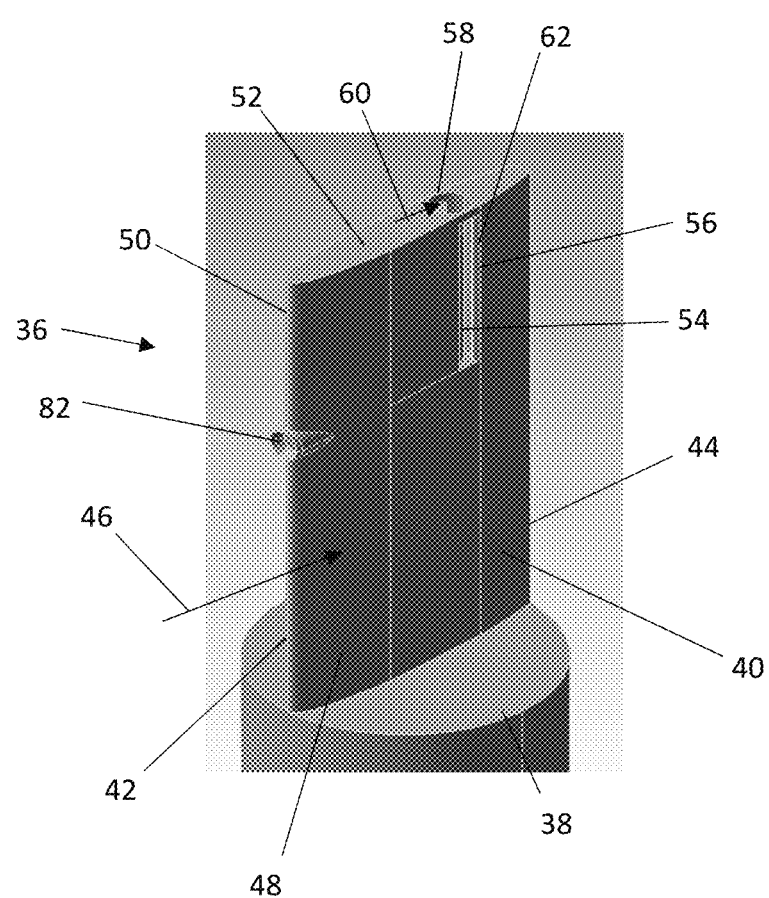
FIG. 3 is an illustration of a pressure and temperature probe.

Referring to FIG. 2, one or more probes 36 extend radially inwardly toward an engine central longitudinal axis A from an interior casing surface 38 of the casing 32. In some embodiments, the probe 36 is a pressure and temperature probe configured to detect a pressure and temperature at the inlet portion 30. Such a probe is also referred to as a P2T2 probe. Referring to FIG. 3, the probe 36 includes a base portion 38 located at the interior casing surface 80, and an airfoil portion 40 extending from the base portion 38 radially inwardly toward the engine central longitudinal axis A. The airfoil portion 40 includes a leading edge 42 and a trailing edge 44, with the leading edge 42 located upstream of the trailing edge 44, relative to a general direction of airflow 46 into the inlet portion 30. A first side 48 and a second side 50 opposite the first side 48 each extend from the leading edge 42 to the trailing edge 44. An end portion 52 of the probe 36 is located at a distal end of the airfoil portion 40, furthest from the base portion 38. A temperature sensor 54 is located in a temperature sensor chamber 56 inside of the airfoil portion 40 of the probe 36. To provide airflow to the temperature sensor 54, a temperature airflow hole 58 is provided through the end portion 52 as a primary source of airflow 60 into the temperature sensor chamber 56. In some embodiments, the temperature airflow hole 58 has a circular cross-section. Further, an airflow slot 62 is provided in one or more of the first side 48 or the second side 50 as a secondary source of airflow to the temperature sensor chamber 56. In some embodiments, an airflow slot 62 length in a direction from the base portion 38 toward the end portion 52 is greater than a streamwise airflow slot 62 width. In some embodiments, a pressure airflow inlet 82 is located at the leading edge 42 to admit a pressure measurement airflow into the probe 36.

Figure 4:
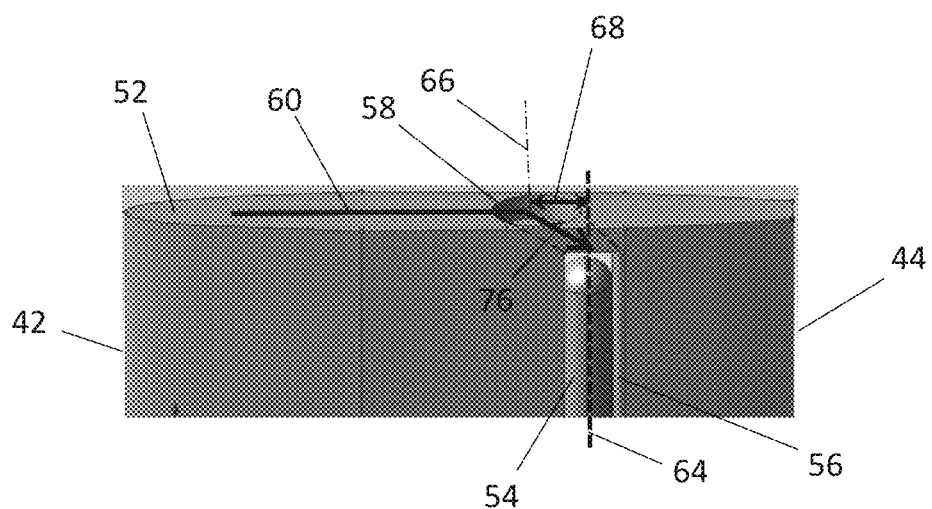
FIG. 4 is an illustration of an end portion of an embodiment of a pressure and temperature probe having an airflow hole axially offset from the sensor.

Referring now to FIG. 4, the temperature sensor 54 extends along a sensor central axis 64 in the temperature sensor chamber 56. In some embodiments, the temperature sensor chamber 56 is symmetrical about the sensor central axis 64. In some embodiments, the temperature airflow hole 58 is offset from the sensor central axis 64, such that an airflow hole central axis 66 is not coaxial with the sensor central axis 64. In particular, the temperature airflow hole 58 is offset in a streamwise direction, such that the airflow hole central axis 66 is nearer to the leading edge 42 of the airfoil portion 40 than the sensor central axis 64. In some embodiments, an offset distance 68 is between about 0.5 and 1.0 of a diameter of the temperature airflow hole 58. The offset of the temperature airflow hole 58 from the sensor central axis 64 improves airflow through the temperature airflow hole 58 by reducing a turning angle of airflow into temperature sensor chamber 56 via the temperature airflow hole 58 to less than 90 degrees, thus improving airflow into the temperature sensor chamber 56 and response of the temperature sensor 54.

Figure 5:
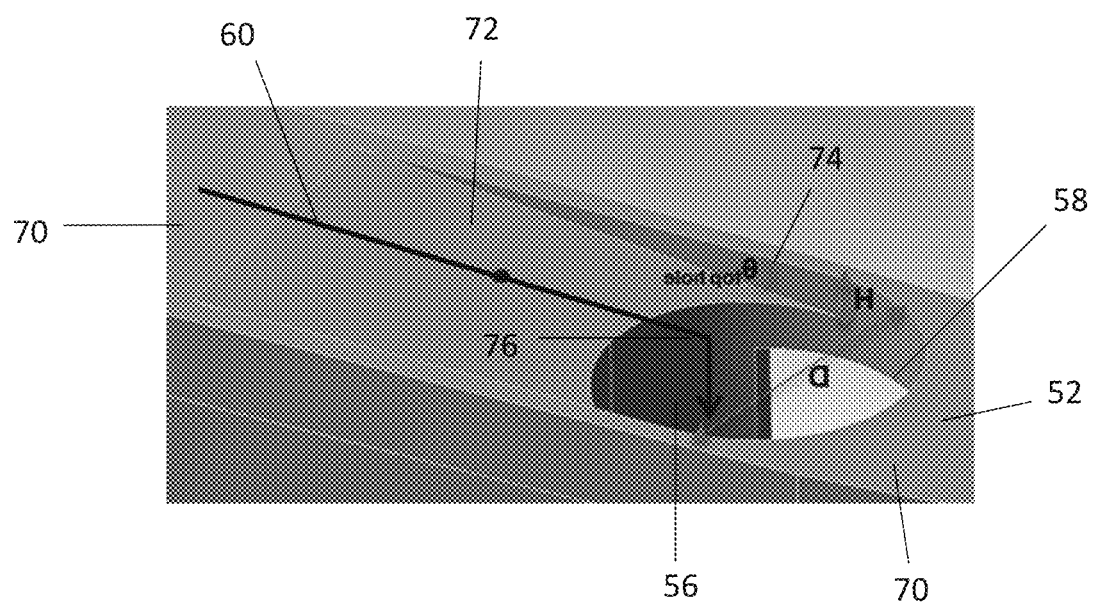
FIG. 5 is an illustration of an end portion of another embodiment of pressure and temperature probe having a sloping end portion surface.

In another embodiment, illustrated in FIG. 5, the end portion 52 includes a first end portion surface 70 and a second end portion surface 72. The second end portion surface 72 is located upstream of the temperature airflow hole 58 relative to the streamwise direction. The second end portion surface 72 is sloped away from the first end portion surface 70 toward the base portion 38 with a decreasing distance from the temperature airflow hole 58. The temperature airflow hole 58 is located along the second end portion surface 72. In some embodiments, the second end portion surface 72 is sloped at a constant slope angle 74 relative to the first end portion surface 70, while in other embodiments other configurations such as a slope having a varying angle or a curvilinear sloping of the second end portion surface 72 may be utilized. In some embodiments, the slope angle 74 is between 0 degrees and 45 degrees, while in other embodiments the slope angle 74 is between 2 degrees and 6 degrees.

The use of the sloping second end portion surface 72 reduces a turning angle of airflow 76 into the temperature airflow hole 58 to below 90 degrees thus resulting in greater airflow through the temperature airflow hole 58 and into the temperature sensor chamber 56. In some embodiments, the sloping end portion 72 may be used in combination with the offset of the temperature airflow hole 58. The configurations disclosed herein improve airflow into the temperature sensor chamber 56 without reducing aerodynamic performance of the airflow portion 40 of the probe 36.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pressure and temperature probe of a gas turbine engine, the pressure and temperature probe comprising:
   a base portion;
   an airfoil portion extending from the base portion to an end portion located at a distal end of the probe furthest from the base portion, the airfoil portion including a leading edge disposed at an upstream end of the probe relative to a direction of airflow across the probe;
   a temperature sensor disposed in a temperature sensor chamber located in the airfoil portion, wherein the temperature sensor extends along a central axis of the temperature sensor chamber; and
   a temperature airflow hole in the distal end of the probe, the temperature airflow hole configured to admit an airflow into the temperature sensor chamber via a surface sloped from the end portion toward the base portion,
   wherein the temperature airflow hole has an airflow hole central axis that is offset from the central axis of the temperature sensor chamber in a streamwise direction, and
   wherein the temperature airflow hole is configured and positioned such that the airflow admitted via the temperature airflow hole has a turning angle of less than 90 degrees into the temperature sensor chamber from the distal end of the probe.

2. The pressure and temperature probe of claim 1, wherein the airflow hole central axis is disposed directly upstream of the central axis of the temperature sensor chamber.

3. The pressure and temperature probe of claim 1, wherein the airflow hole central axis is offset from the the central axis of the temperature sensor chamber by between 0.5 and 1.0 times a diameter of the temperature airflow hole.

4. The pressure and temperature probe of claim 1, wherein the end portion includes:
   a first end portion surface; and
   wherein the surface sloped from the end portion toward the base portion is a second end portion surface that is sloped toward the base portion relative to the first end portion surface with increasing distance from the leading edge;
   wherein the temperature airflow hole is disposed at the second end portion surface.

5. The pressure and temperature probe of claim 4, wherein the slope of the second end portion surface is one of a constant angle, a varying angle, or a curvilinear slope.

6. The pressure and temperature probe of claim 4, wherein a slope angle of the second end portion surface relative to the first end portion surface is between 2 and 6 degrees.

7. The pressure and temperature probe of claim 1, wherein the airflow admitted into the temperature sensor chamber via the surface sloped from the end portion toward the base portion is a first airflow; and
   wherein the pressure and temperature probe further comprises a sensor slot disposed along a side of the airfoil portion to admit a second airflow into the temperature sensor chamber.

8. An inlet of a gas turbine engine, the inlet comprising:
   a casing having a casing inner wall defining an inlet flowpath; and
   at least one pressure and temperature probe extending inwardly from the casing inner wall toward an engine central longitudinal axis, the at least one pressure and temperature probe including:
   a base portion;
   an airfoil portion extending from the base portion to an end portion located at a distal end of the probe furthest from the base portion, the airfoil portion including a leading edge disposed at an upstream end of the probe relative to a direction of airflow across the probe;
   a temperature sensor disposed in a temperature sensor chamber located in the airfoil portion, wherein the temperature sensor extends along a central axis of the temperature sensor chamber; and
   a temperature airflow hole in the distal end of the probe, the temperature airflow hole configured to admit an airflow into the temperature sensor chamber via a surface sloped from the end portion toward the base portion,
   wherein the temperature airflow hole has an airflow hole central axis that is offset from the central axis of the temperature sensor chamber in a streamwise direction, and wherein the temperature airflow hole is configured and positioned such that the airflow admitted via the temperature airflow hole has a turning angle of less than 90 degrees into the temperature sensor chamber from the distal end of the probe.

9. The inlet of claim 8, wherein the airflow hole central axis is offset from the central axis of the temperature sensor chamber by between 0.5 and 1.0 times a diameter of the temperature airflow hole.

10. The inlet of claim 8, wherein the end portion includes:
   a first end portion surface; and
   wherein the surface sloped from the end portion toward the base portion is a second end portion surface that is sloped toward the base portion relative to the first end portion surface with increasing distance from the leading edge;
   wherein the temperature airflow hole is disposed at the second end portion surface.

11. The inlet of claim 10, wherein the slope of the second end portion surface is one of a constant angle, a varying angle, or a curvilinear slope.

12. The inlet of claim 10, wherein a slope angle of the second end portion surface relative to the first end portion surface is between 2 and 6 degrees.

13. A gas turbine engine, comprising:
   a fan driven by a turbine of the gas turbine engine; and
   an inlet disposed upstream of the fan, the inlet including:
      a casing having a casing inner wall defining an inlet flowpath; and
      at least one pressure and temperature probe extending inwardly from the casing inner wall toward an engine central longitudinal axis, the at least one pressure and temperature probe including:
         a base portion;
         an airfoil portion extending from the base portion to an end portion located at a distal end of the probe furthest from the base portion, the airfoil portion including a leading edge disposed at an upstream end of the probe relative to a direction of airflow across the probe;
         a temperature sensor disposed in a temperature sensor chamber located in the airfoil portion, wherein the temperature sensor extends along a central axis of the temperature sensor chamber; and
         a temperature airflow hole in the distal end of the probe, the temperature airflow hole configured to admit an airflow into the temperature sensor chamber via a surface sloped from the end portion toward the base portion,
         wherein the temperature airflow hole has an airflow hole central axis that is offset from the central axis of the temperature sensor chamber in a streamwise direction, and
         wherein the temperature airflow hole is configured and positioned such that the airflow admitted via the temperature airflow hole has a turning angle of less than 90 degrees into the temperature sensor chamber from the distal end of the probe.

14. The gas turbine engine of claim 13, wherein the airflow hole central axis is offset from the central axis of the temperature sensor chamber by between 0.5 and 1.0 times a diameter of the temperature airflow hole.

15. The gas turbine engine of claim 13, wherein the end portion includes:
   a first end portion surface; and
   wherein the surface sloped from the end portion toward the base portion is a second end portion surface that is sloped toward the base portion relative to the first end portion surface with increasing distance from the leading edge;
   wherein the temperature airflow hole is disposed at the second end portion surface.

16. The gas turbine engine of claim 15, wherein a slope angle of the second end portion surface relative to the first end portion surface is between 2 and 6 degrees.

* * * * *